United States Patent
Baentsch et al.

(10) Patent No.: US 9,830,684 B2
(45) Date of Patent: Nov. 28, 2017

(54) AUTOMATIC ROTATION OF DISPLAY CONTENTS OF A HANDHELD COMPANION DEVICE RIGIDLY ATTACHED TO A HANDHELD MOBILE DEVICE

(71) Applicant: International Business Machines Corporation, Armonk, NY (US)

(72) Inventors: Michael Baentsch, Gross (CH); Reto J Hermann, Buttikon (CH); Diego A Ortiz-Yepes, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 14/906,983

(22) PCT Filed: Jul. 15, 2014

(86) PCT No.: PCT/IB2014/063118
§ 371 (c)(1),
(2) Date: Jan. 22, 2016

(87) PCT Pub. No.: WO2015/011607
PCT Pub. Date: Jan. 29, 2015

(65) Prior Publication Data
US 2016/0171661 A1  Jun. 16, 2016

(30) Foreign Application Priority Data
Jul. 24, 2013  (GB) .................................. 1313167.7

(51) Int. Cl.
*G06T 3/60* (2006.01)
*G06F 1/16* (2006.01)

(52) U.S. Cl.
CPC .............. *G06T 3/60* (2013.01); *G06F 1/1632* (2013.01); *G06F 1/1647* (2013.01); *G06F 1/1654* (2013.01); *G06F 2200/1637* (2013.01)

(58) Field of Classification Search
CPC  G09G 2340/0492; G09G 5/00; G06F 1/1626; G06F 1/1601; G06F 1/1684
See application file for complete search history.

(56) References Cited

U.S. PATENT DOCUMENTS

| 6,982,728 B1 | 1/2006 | Nicolas et al. |
| 7,227,537 B2 | 6/2007 | Nakayama et al. |

(Continued)

FOREIGN PATENT DOCUMENTS

| GB | 2378032 A | * | 1/2003 | ........... G06K 1/1626 |
| GB | 2479996 A | | 11/2011 | |

(Continued)

OTHER PUBLICATIONS

Rosenzweig, Macmost Now 825: Using Your iPad as a Second Display for Your Mac, Macmost.com, Feb. 11, 2013.

(Continued)

*Primary Examiner* — Todd Buttram
(74) *Attorney, Agent, or Firm* — Rabin Bhattacharya

(57) ABSTRACT

The present invention is directed to a handheld companion device, including: a screen, rigid physical connection means, communication means, adapted for setting up and supporting at least one communication link with at least one external computerized system; and a memory storing computerized methods. The present invention is further directed to related systems and methods for automatically rotating contents displayed on such devices, when rigidly attached on a handheld mobile device.

14 Claims, 7 Drawing Sheets

(56) References Cited

U.S. PATENT DOCUMENTS

| | | |
|---|---|---|
| 2005/0237699 A1 | 10/2005 | Carroll |
| 2010/0177047 A1* | 7/2010 | Brenneman ............ G06F 1/1616 345/173 |
| 2011/0276911 A1 | 11/2011 | Choi |
| 2012/0242703 A1* | 9/2012 | Sirpal .................... G06F 1/1616 345/649 |
| 2013/0109371 A1* | 5/2013 | Brogan ................. G06F 1/1626 455/420 |
| 2014/0164228 A1* | 6/2014 | Pathak .................. G06Q 20/227 705/39 |

FOREIGN PATENT DOCUMENTS

| | | |
|---|---|---|
| TW | 201201225 A | 1/2012 |
| WO | 2012/044801 A1 | 4/2012 |

OTHER PUBLICATIONS

Egan, How to Plug in a Laptop to a TV via HDML, PC Advisor, Jul. 11, 2012.

Patently Apple, Apple Reveals New Two-Way "Airplay" Interactivity & Hints of TV, May 23, 2013.

* cited by examiner

AUTOMATIC ROTATION OF DISPLAY CONTENTS OF A HANDHELD COMPANION DEVICE RIGIDLY ATTACHED TO A HANDHELD MOBILE DEVICE

CROSS-REFERENCE TO RELATED APPLICATION

This application claims priority under 35 U.S.C. §371 from PCT Application PCT/IB2014/063118, filed on Jul. 15, 2014, which claims priority from United Kingdom Patent Application No. 1313167.7 filed Jul. 24, 2013. The entire contents of both applications are incorporated herein by reference.

FIELD OF THE INVENTION

The present invention relates to the field of handheld companion devices such as secure devices, user trusted devices or the like, as well as related devices, systems and methods. In particular, it is directed to methods for automatically rotating contents displayed on such devices, when rigidly attached on a handheld mobile device.

BACKGROUND

One knows numerous handheld mobile devices such as smart phones and tablets also known as handheld devices, handheld computers or simply handhelds. One also knows "secure device", or "trusted device" or "user trusted device", etc., which are handheld companion devices, meant to be connected or coupled to a host. Such devices typically are USB devices, such as security token (or hardware token, or authentication token, USB token), typically the size of a USB key. There is no general definition of a secure device in textbooks. This probably is a consequence of the fact that security for a device cannot be defined in absolute terms but only in a given context, called "security model". Such a model describes the overall system and security assumptions of its constituent parts (e.g., a secure device, a host, a server, communication protocols, etc.). Moreover, this model describes scenarios in which the system can be attacked ("threat model"). Then, a "security device", i.e., one part of the system, will be considered to be secure if it is able to achieve its function vis-a-vis the threats given the security assumptions hold, that is, in the given threat model. In that sense, a "secure device" is a device that is able to perform at least one of its functions securely with respect to at least one type of threat in a given threat model. It can hence be considered a trusted device to perform this function. The reader may refer to the following set of standards known as "Common Criteria", which aim at certifying levels of security for computer security systems (hardware and/or software).

It is for instance well-accepted by persons skilled in the art that a secure device is secure when it is equipped with very limited interfaces towards the "outside word" and is provided with means for protecting sensitive material. It may for example use tamper resistant hardware to store private credentials. Information that flows in via these interfaces is subject to careful security checks to ensure that it is authentic (regarding its origin) and expected when received. If that is not the case, then no action is taken by the device. Similarly, when some information is sent from the device, it is packaged in such a way that certain external entities can perform similar (security-related) validations.

For online transactions, a solution which has been developed is the so-called Zone Trusted Information Channel (or ZTIC for short). The ZTIC is an example of a handheld companion device, which is a secure device, inasmuch as it is capable to perform at least one of its functions securely with respect to one type of threats. It is a non-programmable device, designed for the authentication of transaction data. Since the ZTIC maintains a secured end-to-end network connection to the server, the ZTIC itself is tamper-proof against malicious software attacks and as it has its own input and output components independent of the host it connects to, the data shown on the ZTIC display is genuine. The ZTIC security concept usually depends on the identification of a reasonably small subset of the data visible on the screen of the host device, e.g., transaction data in the case of online banking. Typically, the server prescribes which data is considered critical (and accordingly requires explicit off-host verification) and which data is not critical.

Handheld mobile devices (hereafter MDs) such as smart phones and tablets are increasingly becoming the platform of choice on which users execute their applications. These mobile device platforms are typically capable of rotating the screen content depending on the way the user orients the device. Screen-(re)orientation is usually based on sensor outputs. MDs supporting screen-reorientation typically include a 3-D accelerometer capable of measuring static acceleration in order to determine the physical orientation in space. Based on the x-, y- and z-axis output of the 3-D accelerometer the platform operating system autonomously re-orients the screen contents and/or generates orientation-change events that applications can subscribe to in order to perform the re-orientation or, in certain but rare instances, suppress the autonomous re-orientation if undesired.

SUMMARY OF THE INVENTION

According to a first aspect, the present invention is embodied as a handheld companion device, including: a screen, a rigid physical connection means, adapted for rigidly attaching the companion device to a mobile device communication means, adapted for setting and supporting at least one communication link with at least one external computerized system; and a memory, storing computerized methods, which are adapted, upon execution at the companion device, for: cooperating with the communication means to set up the at least one communication link and receive orientation data of the mobile device and contents, from the at least one external computerized system, via the at least one communication link; and re-arranging and displaying the contents on the screen according to the orientation data.

Preferably, the rigid physical connection means includes a communication circuit, the latter forming part of the communication means, the communication circuit adapted for supporting at least one communication link.

In embodiments, the computerized methods are designed, upon execution at the companion device, for re-arranging the contents according to: a dynamic rotation angle, by which the mobile device is rotated relative to a reference orientation; and, preferably, a fixed, relative angle between a reference axis of the mobile device and a reference axis of the companion device, when the companion device is attached to the mobile device; or, more preferably, a total angle depending on both the dynamic rotation angle and the fixed, relative angle, for example as $=-(\alpha+\beta) \mod 2\pi$.

In embodiments, the screen of the companion device has an essentially square aspect ratio.

In variants, the computerized methods are further adapted for restricting the contents displayed to an area having at least 4n-fold rotational symmetry, with n ≥1, such as a square area, provided within a screen area of the screen of the companion device, the area having at least 4n-fold rotational symmetry, with n≥1, being preferably off-centered towards an edge surface of the companion device that includes user interface controls.

In embodiments, the companion device further includes user interface controls provided on an edge surface opposite to an edge surface on which the rigid physical connection means is located, and wherein, preferably, most or all physical user interface controls of the companion device are provided on the opposite edge surface only.

In preferred embodiments, the rigid physical connection means is a bidirectional communication connector, preferably a tip-ring-ring-sleeve, or TRRS, 3.5 mm audio connector, the communication means being adapted for communicating with the mobile device via audio signaling across a TRRS bi-directional audio-link.

According to another aspect, the invention is embodied as a system including such a companion device and the mobile device, the companion device rigidly attached to the mobile device.

According to another aspect, the invention is embodied as a computerized method for re-arranging contents and displaying re-arranged contents on a screen of such a companion device, the method including: upon attaching a companion device to a mobile device, cooperating with the communication means to set up the at least one communication link and receive contents and orientation data of the mobile device, from the at least one external computerized system; and re-arranging and displaying the contents on the screen according to the orientation data.

In embodiments, cooperating with the communication means includes communicating with the mobile device and/or a server to receive the contents and orientation data of the mobile device.

Preferably, cooperating with the communication means includes communicating with a server via the mobile device.

In preferred embodiments, cooperating with the communication means includes communicating with the mobile device to receive orientation data and communicating with the server to receive or cross-check contents.

In embodiments, displaying the re-arranged contents includes restricting the contents displayed to an area having at least 4n-fold rotational symmetry, with n ≥1, fitting in a screen area of the screen of the companion device, and preferably instructing to off-center the area having at least 4n-fold rotational symmetry.

Preferably, cooperating with the communication means includes establishing a bidirectional communication link with and/or via the mobile device, the method further including: upon receiving a user instruction via a user interface of the companion device, communicating the user instruction to the mobile device and/or a server via the mobile device.

According to a final aspect, the invention is embodied as a computer program product, including program code means for implementing the steps of any one of the above computerized methods.

Devices, systems and methods embodying the present invention will now be described, by way of non-limiting examples, and in reference to the accompanying drawings. Technical features depicted in the drawings are not to scale.

DETAILED DESCRIPTION OF THE INVENTION

Figure 1A:
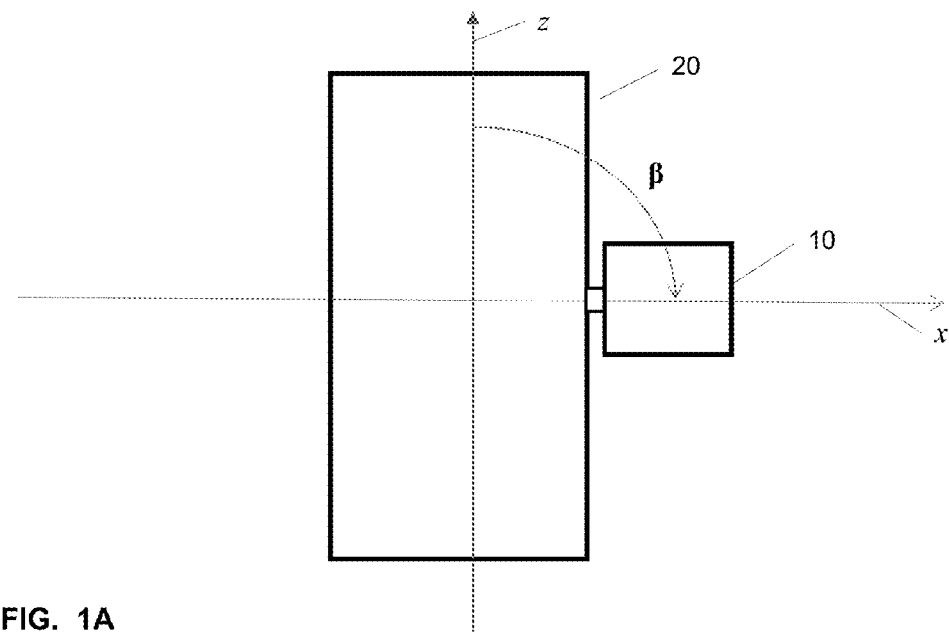
FIGS. 1A and 1B schematically illustrate the rotation of a system including a companion device rigidly attached to a mobile device, and angles relevant to the rotation, as involved in embodiments.

The following description is structured as follows. First, general embodiments and high-level variants are described. The next section addresses more specific aspects, embodiments and technical implementation details.

It would be advantageous for many users to be able to use a companion device (CD) with their handheld mobile device (MD). However, this poses a number of practical problems, notably in terms of handling and ergonomics, addressed by embodiments of the present invention.

To start with, and as explained in the background section, screen-(re)orientation of MDs can be based on 3-D accelerometer outputs. Such re-orientation mechanisms work reliably for the majority of situations. They may, however, fail sometimes, e.g., when the MD is rotated very slowly or when the rotation takes place on top of a flat surface. Assume that one may connect a CD to a MD. Re-orientation of CD screen contents could be achieved in the same manner as for the MD, i.e., the CD could be equipped with a 3-D accelerometer. However, this has the following drawbacks: a 3-D accelerometer would increase the costs, manufacture complexity, size and weight of the CD. In addition, the processing capabilities to compute the physical device orientation add to the cost of the CD. But more importantly, the occasional misbehavior of the re-orientation mechanism in either device (CD or MD) would lead to the situation that the orientations of the contents on the two screens might not always match. The likelihood of this occurring is higher when two independent non-perfect sensor devices are combined. This artifact could be unacceptable for a user.

In the following, one considers application scenarios involving the companion device in addition to the mobile device, where the companion device itself has a display. It is further assumed that the CD can be physically attached to the MD in a rigid manner, such that operation of the two devices can be carried out as if they were a single aggregated device. Finally, application scenarios are described that span both the MD and CD, i.e., applications that use the displays of both devices in concert to present their content. This distributed application nature implies that the MD and CD can communicate either to one another or each to a network entity, e.g., a same network-based entity. In such scenarios, it is very much desirable that the orientation of the contents on the MD and CD displays match and that their re-orientation is executed in synchrony.

Embodiments described below achieve screen contents synchronization by a master/slave concept. As pointed out, the distributed nature of the application implies direct or indirect communication capability between the MD and the CD. The methods proposed use simple signaling mechanisms, whereby the MD propagates orientation-change events to the CD. The signaling occurs via a communication link between MD and CD, directly or indirectly via a common network-based entity. The contents may be provided from or cross-checked by a network entity, for security purposes.

In reference to FIGS. 1 to 10, a first aspect of the invention is now described in detail, which concerns the handheld companion device 10, hereafter CD. The latter is assumed to have a screen 19; it may typically include usual user interface controls, such as buttons 18a, 18b. The CD 10 is further equipped with rigid physical connection means 13, adapted for rigidly attaching the CD to MD 20 thereby maintaining the relative orientation between CD and MD. It also includes communication means 13, 13a, 14. Such communication means are configured for setting up and supporting at least one communication link with at least one external computerized system 20, 30. It further has a memory 16, storing notably some computerized methods 162. Upon execution, computerized methods 162 cooperate with the communication means to set up the at least one communication link, as needed to receive inputs that include orientation data $\alpha$, $\gamma$ of the MD 20, as well as contents to be displayed. Such inputs are received from the external computerized system(s) 20, 30, via communication link(s) established thereto. Methods 162 further result, while executing, in re-arranging and displaying the received contents on the screen 19, and this, according to the received orientation data $\alpha$, $\gamma$.

Rigid physical connection here means a non-permanent affixment resulting in that the CD remains rigidly attached to the mobile device MD (thereby maintaining the relative orientation between CD and MD, even when moving the MD), e.g., a TRRS audio connector or a USB connector. Some degree of freedom may remain, e.g., a free rotation around a main axis of a TRRS connector, thus improving ergonomics of the connected system (i.e., a system that includes the MD and CD, the latter rigidly connected to the former). It is understood that the rigid physical connection means 13 further allows for detaching the CD from the MD, after use.

The communication means may involve at least one communication interface 13a, such as a TRRS or a USB interface, as well as network card 14. The communication interfaces 13a may for instance involve some electronics, notably to match the signal levels to processor 12. Computerized methods 162 may be stored as application programs or a firmware. Preferably, they are stored as a firmware because a CD as contemplated herein likely consists essentially of an embedded device. In addition, the present CDs are much preferably non-programmable by the user. Notwithstanding, scenarios are contemplated that span both the MD and CD, i.e., applications that use the displays of both devices in concert to present their contents.

Figure 6:
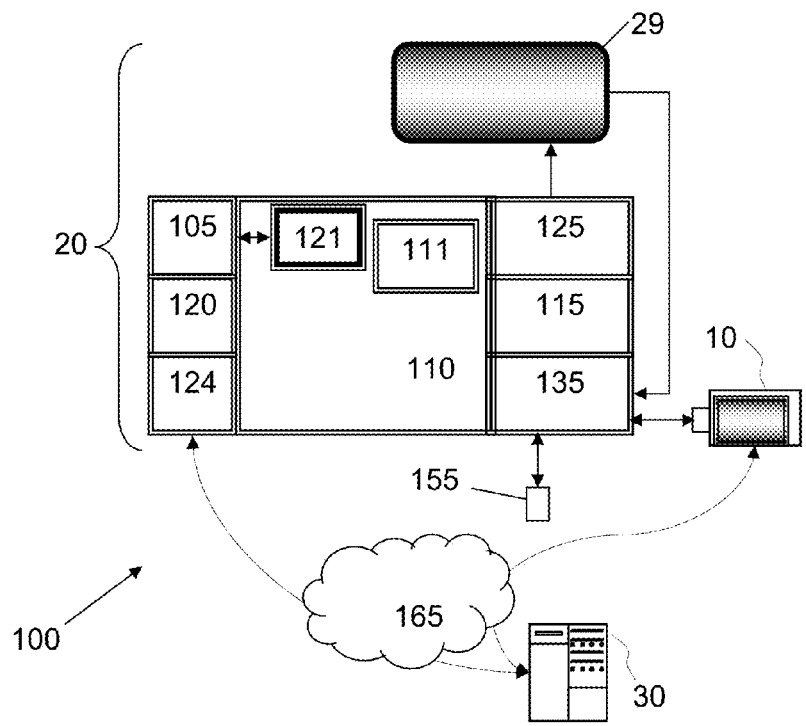
FIG. 6 schematically represents a general purpose computerized system, including a companion device rigidly attachable to a mobile device, and a server, this system suited for implementing methods for re-arranging contents and displaying re-arranged contents on the screen of the companion device, according to embodiments of the invention.

Upon execution at the user device 10, the computerized methods 162 shall cooperate with the communication means to communicate with at least one external computerized system 20, 30, see FIG. 6. "External system" is here to be interpreted in a broad sense as it may include a server 30 and/or the MD 20, i.e., computerized apparatuses that are external to the CD. Computerized methods 162 execute locally at the CD, but may nonetheless work in concert with an application, running locally and/or at an external computerized system. Thus, applications may simultaneously run at the CD and at an external computerized system e.g., a server and/or the MD, notably to communicate contents to be displayed at the CD and orientation data of the MD.

Figure 2:
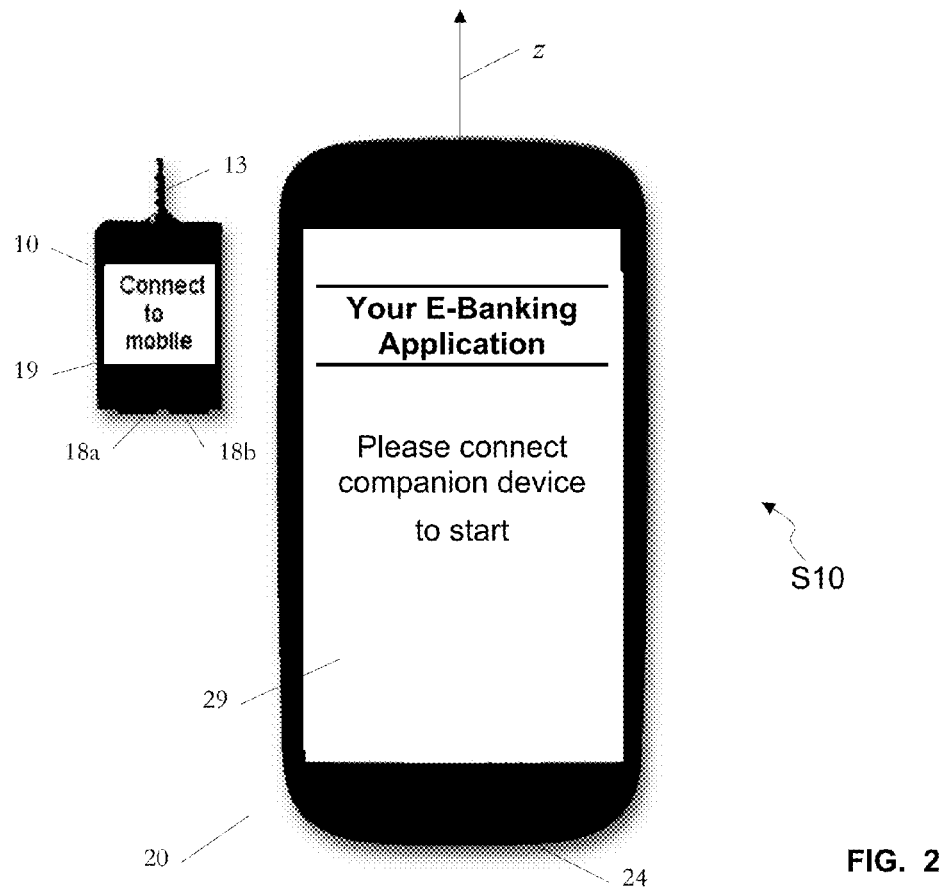
FIGS. 2 to 4 schematically illustrate the rotation of screen contents in a system including a companion device rigidly attached to a mobile device, each of the companion device and the mobile device having a display.
Figure 3:
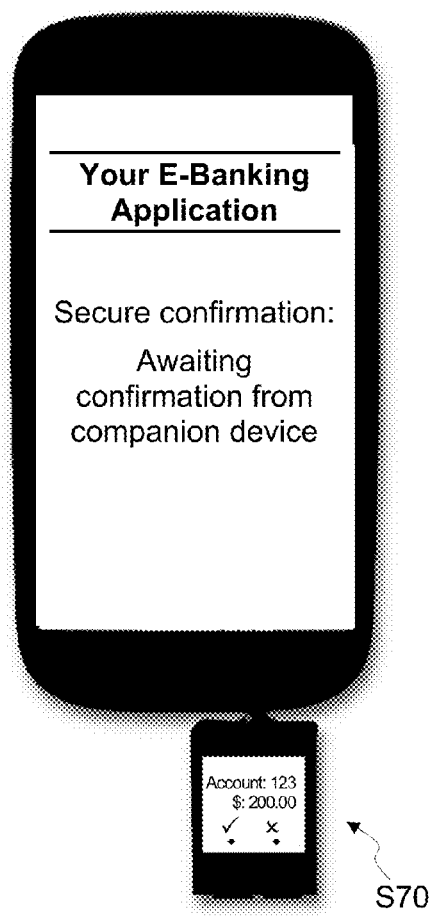
Figure 4:
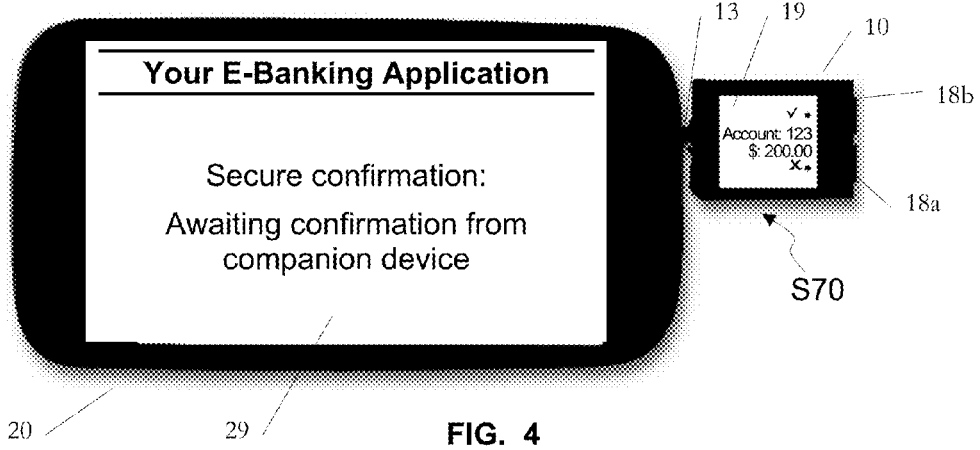

The cooperation between the methods 162 and the communication means results in re-arranging and displaying contents on the CD's screen 19, as illustrated in FIGS. 2-4, whereby the contents typically changes dynamically, e.g., as per interaction with the user. Namely, the computerized methods 162 cooperate with the communication means to receive (if necessary upon request) from an external computerized system 20, 30 the contents and orientation data, the latter used to re-arrange (e.g., re-cast, re-flow and/or rotate) the received contents on the CD's screen 19.

Note that the contents displayed at the CD may differ from the contents displayed at the MD, or at least may be built independently, a thing that is critical for some security applications as contemplated herein. In addition, the contents need not be passed in their entirety to the CD. Rather, a simple code may be transmitted, to be interpreted at the CD for subsequent display. For instance, these contents may simply be cross-checked by interacting with a server.

The orientation data may correspond to the actual orientation of the MD, i.e., the raw sensor output data, or to the discrete orientation of the MD screen contents relative to a reference orientation of the MD. Beyond these two examples, several types of orientation data could be used. It is however preferred to use the discrete orientation of the MD screen contents, since this allows for better synchrony.

Figure 7:
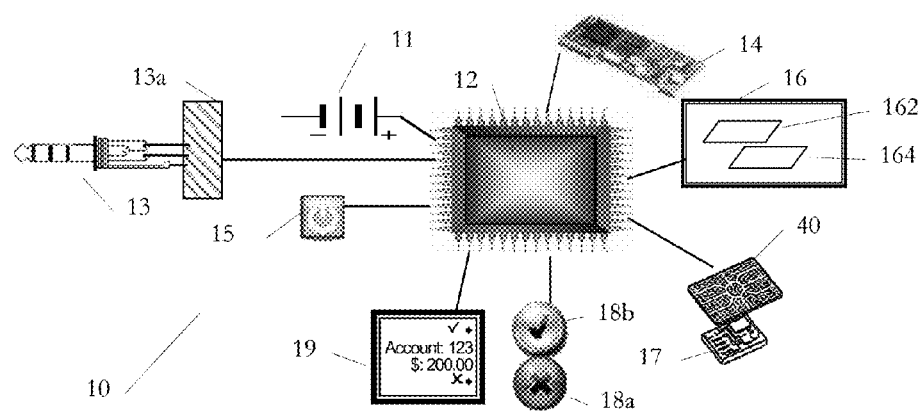
FIG. 7 is a block diagram schematically illustrating selected components of a companion device according to embodiments.

Referring now more particularly to FIG. 7: in embodiments, rigid physical connection means 13 includes a communication circuit, i.e., otherwise forming part of the aforementioned communication means. This communication circuit is adapted for supporting communication links, e.g., to the MD and/or to a server via the MD 20.

The rigid physical connection means 13 may for instance be a bidirectional communication connector, preferably a tip-ring-ring-sleeve, or TRRS, 3.5 mm audio connector, the communication means being adapted for communicating with the mobile device 20 via audio signaling across a TRRS bi-directional audio-link. A TRRS connector is preferred, for compatibility purposes, as many handheld devices are provided with TRRS sockets. Although a TRRS connection is usually intended for communicating audio contents, advantage can be taken from the fact that both the microphone line and the headphone line can be used to enable a bidirectional communication link to the MD. A TRRS audio connector further allows for rotation of the affixed CD around its main axis, which is advantageous in terms of user ergonomics (the user may notably correct the inclination of the device 10, for enjoying a better interaction therewith). A TRRS connector includes four electrical connections. One is the shared ground, another one is the microphone line providing an outgoing channel from the CD to the MD, and two are the speaker lines providing an incoming channel from the MD to the CD. Besides the microphone line, only one of the speaker lines is needed for supporting bi-directional communication. However, using both speaker lines allows for gaining additional throughput. Still, the TRRS audio-interface is only one example of an interface providing both connection and communication. Clearly the connection could alternatively be embodied as a USB or any suitable proprietary dock connector. In variants or complementary to this connector 13, the CD 10 may be equipped with its own network access means 14.

Figure 1B:
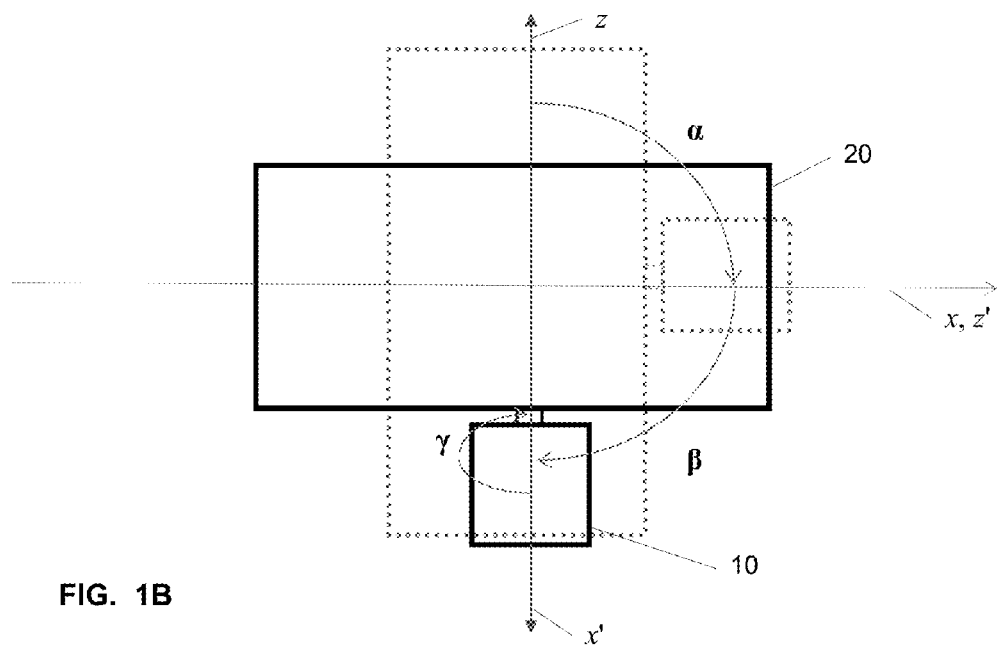

In embodiments, the aforementioned computerized methods 162 are preferably designed for re-arranging the contents according to at least one angle of interest, as discussed now in reference to FIGS. 1A and 1 B. FIG. 1A schematically represents a CD attached to a MD, in an initial orientation (coinciding with the natural orientation of the MD). FIG. 1B represents the same system after clockwise rotation of $\pi/2$. Note that angles are measured clockwise in this example as well as in FIGS. 2-4, contrary to the trigonometric convention (this, however, does not limit the scope of the present invention). The orientation data may notably include a fixed, relative angle $\beta$ between the reference axis z of the mobile device and a reference axis x of the CD 10, when the CD is attached to the mobile device, i.e., $\beta = \angle(z, x)$. Note that in FIGS. 1A and 1B, $\beta = \pi/2$ (measured clockwise), whereas $\beta = \pi$ in FIGS. 2-4. Other values may be contemplated, e.g., $\beta = \pi$ or $3\pi/2$.

The orientation data may further include dynamic rotation angle $\alpha$, by which the MD, or equivalently the system S10 (consisting of MD 20 and CD 10), is rotated relative to the initial orientation z to its new orientation z', as illustrated in FIG. 1B, i.e., $\alpha = \angle(z, z')$. After such a rotation of system S10 takes place, the MD rotates the contents of its display by $-\alpha$ (or a closest discrete value). Consistently, the contents of the CD display may be rotated by $\gamma = -(\alpha+\beta) \mod 2\pi$, for the orientations of the contents of the MD display 19 and CD display 29 to match. In variants, the orientation data transmitted may consist of the current total angle $\gamma$, which depends on both the dynamic rotation angle $\alpha$ and the fixed, relative angle $\beta$ as described. Alternatively, one may transmit $-(\alpha+\beta)$ to the CD, the modulo operation being carried out at the CD or at server 30, etc. In other variants, the relative angle $\beta$ may be independently known by methods 162 and therefore may not need to be passed to the CD.

The reference orientation considered is typically the natural orientation of the MD, e.g., a main longitudinal axis z of a smartphone, as assumed in FIGS. 1-5. The concepts of reference/natural orientations are known per se. Each MD has a natural orientation. Based on data produced by a suitable sensor integrated within the MD, the MD can evaluate dynamic rotation angle $\alpha$, which changes as a user holds and moves the MD, and rotate its screen contents accordingly by $-\alpha$. As evoked above, the angle $\gamma$ of back-rotation of the screen contents is typically opposite to the actual rotation $\alpha+\beta$.

Furthermore, the angle $\gamma$ preferably is a discrete version of $-(\alpha+\beta) \mod 2\pi$, i.e., the closest multiple of $\pi/2$ in most cases or, more generally, of $2\pi/n$ for a CD screen enabling n-fold rotational capability (n=4 for a rectangular screen, even though a rectangular screen does not possess 4-fold rotational symmetry). Similar considerations apply in fact to the MD, except that for the CD, an additional angle, i.e., fixed angle $\beta$, needs be suitably identified and taken into account to operate a correct rotation of the screen contents, to achieve synchronous orientation with the MD.

Note that $\alpha$ and $\beta$ are 2D rotation angles, in-plane with the screen panel of the MD. Should one instead use raw accelerometer data or any data possibly produced by an accelerometer or other sensor, one understands that any information that goes beyond the strictly required 2D information could be disregarded, for the purpose of re-orientating screen contents of the CD.

FIGS. 2 to 4 explicitly illustrate the rotation of screen contents in a system including a CD and a MD. FIG. 2 shows the natural orientations of the MD and the CD. Once the CD is attached to the MD (FIG. 3), it is apparent that the fixed, relative angle $\beta$ between the reference axis of the mobile device and the reference axis of the CD is $\pi$ in this example (at variance with FIG. 1, where $\beta = \pi/2$). Therefore, in FIG. 3, the contents displayed on the CD are rotated by $-\beta$ ($\alpha = 0$ so far). After rotating the system by $\alpha = -\pi/2$ (FIG. 4, measured clockwise), the MD rotates the contents of its display by $\pi/2$ and, consistently, the contents of the CD display are rotated by a multiple of $\pi/2$ that is the closest to $-(\alpha+\beta) \mod 2\pi$, that is, by $-\pi/2$ (still measured clockwise), with respect to its natural orientation (as shown in FIG. 2), such as to match the orientations of the MD and the CD.

Next, in embodiments, the screen of the CD may have an essentially square aspect ratio, rather than a rectangular aspect ratio as usually provided in handheld devices, in order to easily accommodate re-orientations of screen content. This is for instance the case in the embodiments illustrated in FIGS. 2-4. Ideally, a 1:1 ratio is preferred, subject to small deviations e.g., 0.9-1.1:0.9-1.1. Departing from this ideal aspect ratio would imply unnecessary reflowing or more generally, re-arrangement of the contents to be displayed on the CD, a process that would require more computational resources. The additional resources required for re-arranging the contents are, however, not an issue if the re-arrangements are decided at an external entity such as a server, i.e., an entity that typically has considerably more computing resources than the CD. In variants (not shown in FIGS. 2-4), screen 19 (whether square or not), may be off-centered towards that edge surface that includes the user interface controls (like buttons 18a, 18b), or most of the controls, e.g., in order to be able to place icons close to their corresponding controls/buttons, to improve the user experience.

Figure 5:
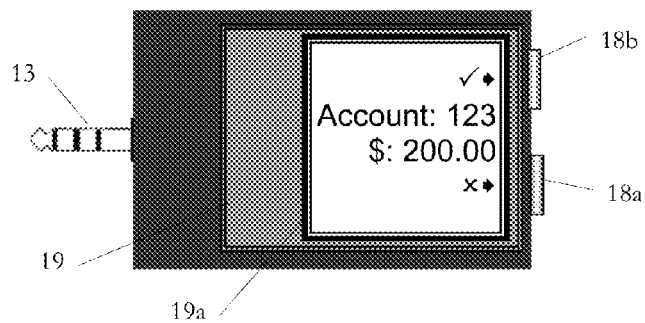
FIG. 5 schematically illustrates a companion device such as shown in FIGS. 2-4, wherein the contents displayed are restricted to an essentially square area, provided in the screen of the companion device, according to embodiments.

In variants, and as illustrated in FIG. 5, the computerized methods 162 may be adapted for restricting the contents displayed to a symmetric area 19a provided within a screen area 19 of the screen of the CD 10, e.g., an area having a higher symmetry than the screen, to limit or suppress the need for re-arranging screen contents at the CD. The symmetric area may for instance be an area having at least 4n-fold rotational symmetry, with n≥1, such as a square area (or essentially square). In that case, and assuming that the MD use discrete values that are multiples of $\pi/2$ to re-orientate its screen contents, one understands that no-reflowing is necessary. More generally, should the MD use other discrete values, e.g., multiples of $\pi/m$, then the symmetric area 19a may have at least 2 m n-fold rotational symmetry. Note that, at the limit of large values of n, the restricted area 19 approaches a disk. Too high a symmetry implies a loss of available space for displaying contents; therefore, small values of n are preferred, e.g., n=1. In all cases, even if the device 10 is by default equipped with a non-square screen, one understands that it is possible to restrict the displayed contents to a reduced, suitably symmetric display area 19a on the screen 19, such as to suppress the need for reflowing the screen contents at the CD. In addition, symmetric area 19a is preferably off-centered towards that edge surface that includes the user interface controls (like buttons 18a, 18b), or most of the controls, e.g., in order to improve the user experience, as evoked earlier. Note that in FIG. 5, both screen 19 and display area 19a are off-centered.

Referring now to both FIGS. 2 and 5: some user interface controls 18a, 18b are preferably provided on the edge surface that is opposite to the edge surface on which the rigid physical connection means 13 is located. More preferably, most or all physical user interface controls of the CD 10 are provided on the opposite edge surface only, rather than on the panel that contains the screen. For example, buttons of the CD can be provided on the edge opposite to the one from which a TRRS audio connector protrudes. This allows for minimizing the surface required on the CD (and to use as much of it as possible for the display). All the more, this allows for the user to be able to see the screen and for minimizing the moment of force exerted by the user on the physical connector 13, while actuating the controls. This, in turn, lowers the risk of wear, damage or breakage of the connector.

According to another aspect, the invention can be embodied as system 100, i.e., a system that includes not only a CD 10 such as described above, but in addition a MD 20, the CD rigidly attached to the MD 20. The system may further include a server, as illustrated in FIG. 6.

Figure 8:
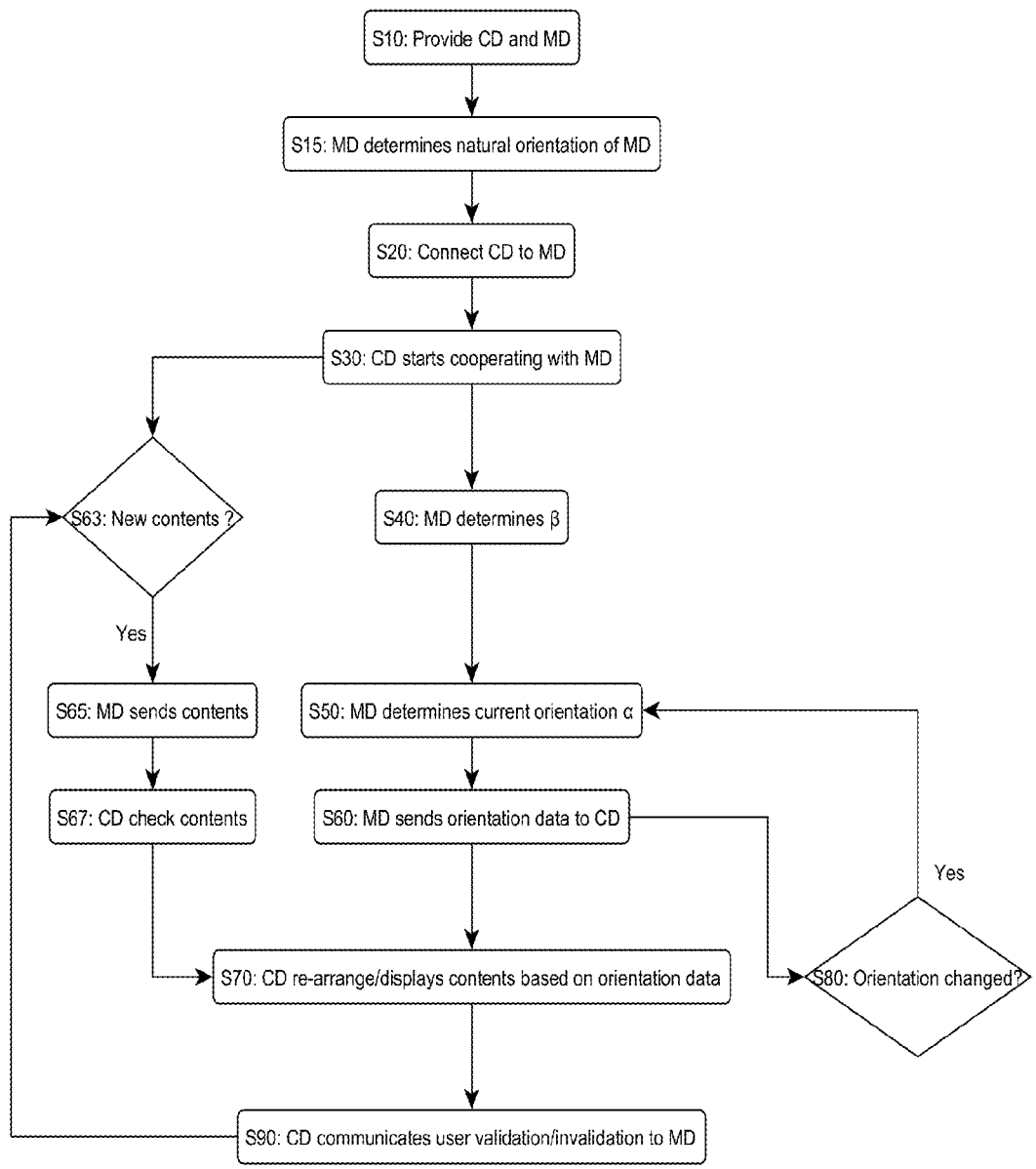
FIGS. 8-10 show, each, a flowchart illustrating high-level steps of methods according to embodiments.
Figure 9:
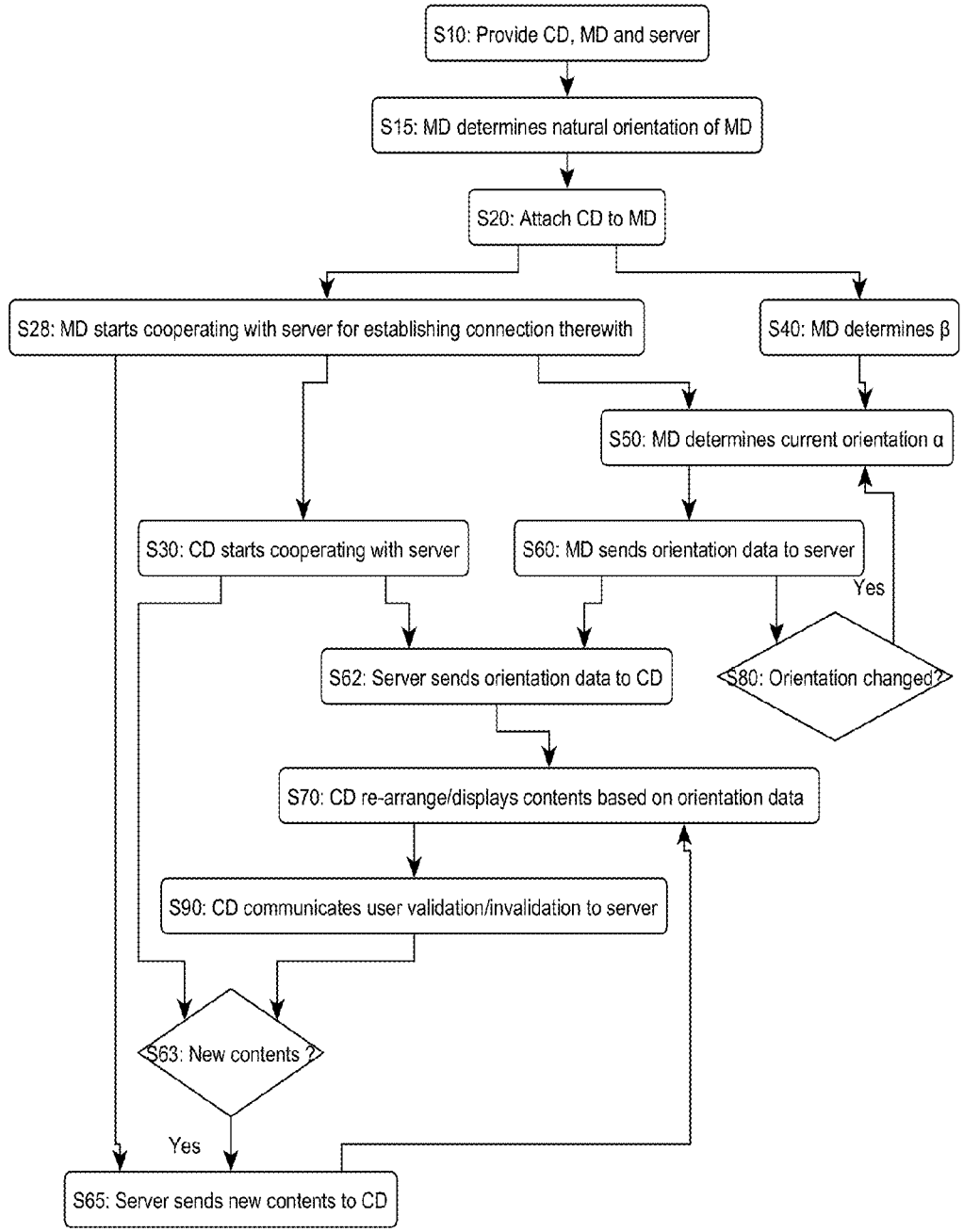
Figure 10:
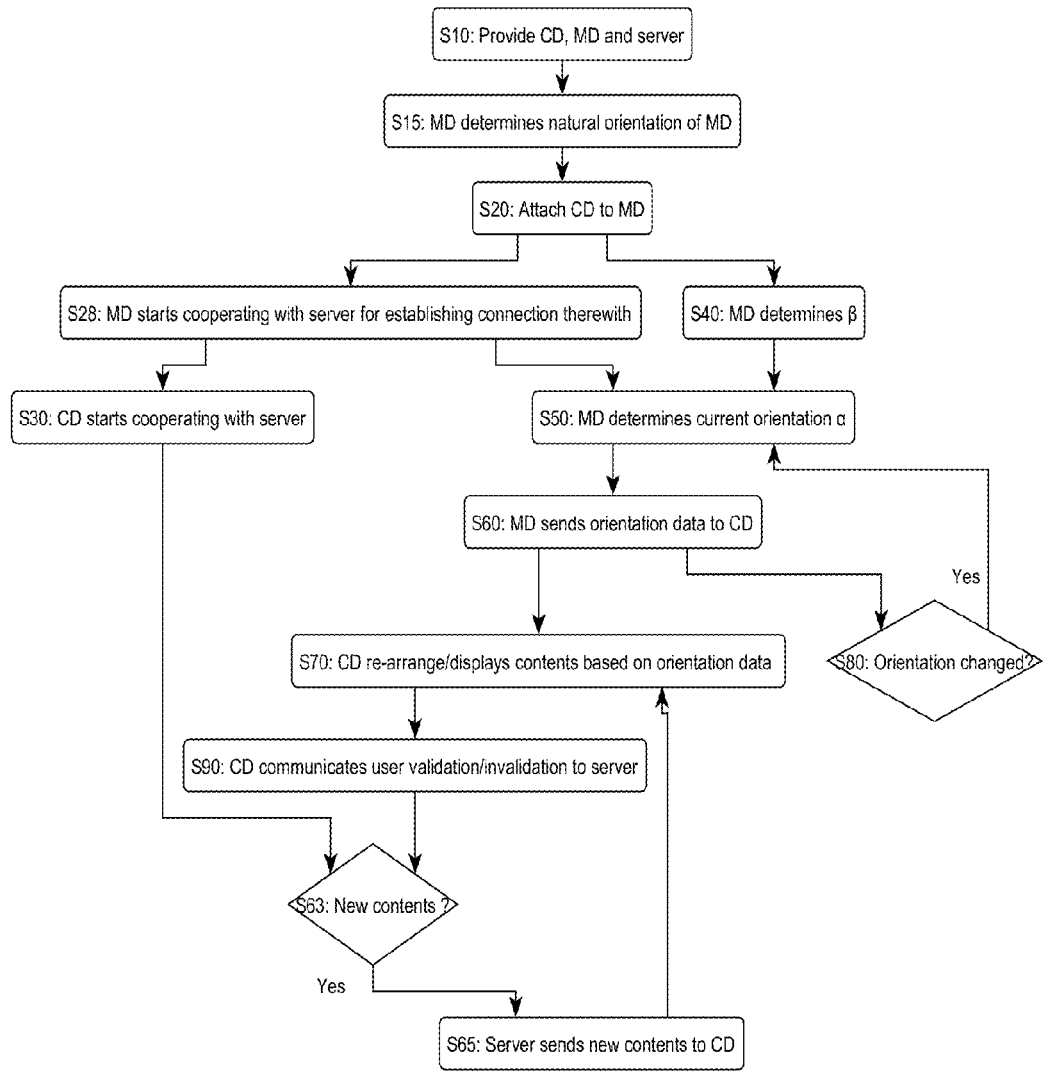

According to still another aspect, the invention can be regarded as a computerized method for re-arranging contents and displaying re-arranged contents on a screen of CD 10 such as described earlier. Referring to FIGS. 8-10 (and also to FIGS. 2-4), such a method basically includes the following steps: upon attaching a CD 10 to a mobile device 20 or responsive thereto, a suitable entity 162 cooperates with the communication means of the CD 10 to set up (steps S28, S30) the required communication links, and this, in order to be able to receive (steps S60, S65) the contents to be displayed, as well as orientation data α, γ of the mobile device 20, from at least one external system 20, 30; and then this entity 162 proceeds to re-arrange and display (step S70) the contents on the CD's screen 19, and this, according to the received orientation data α, γ.

Examples of interaction scenarios are proposed in FIGS. 8-10. In FIG. 8, only a CD and MD are involved (though the step S67 of checking may involve a server). In that case, both the contents and orientation data are provided by the MD 20. In FIGS. 9-10, a server is additionally involved, which sends (or cross-check) contents to be displayed at the CD, step S65. The main difference between the scheme of FIGS. 9 and 10 is that in FIG. 9, the MD sends the orientation data to the server, step S60, which provides them in turn to the CD, step S62, such that no communication link need be established between the MD and the CD in that case. Rather, the CD and the MD connect, each, to the server 30. In FIG. 10, two distinct links are established, a first one between the MD and the CD to pass orientation data (step S60), and a second one between the server and the CD, to provide or validate contents to be displayed at the CD, step S65.

Thus, the cooperation between entity 162 and communication means of the CD 10 may involve communicating with the mobile device 20 and/or a server 30, in order to receive both the contents to be displayed and the orientation data α, γ of the mobile device 20. The re-arrangement of the contents is managed by the entity 162 (i.e., computerized methods that execute on the CD, which can be an application or a firmware). The required re-arrangement may however be suggested by the application that produces the contents; and this application may be running on the MD, the CD or both the MD and the CD, or even running primarily on a server, or concurrently on any two of, or each of the server, the MD and the CD (distributed application). Besides, the contents and orientation data communicated may be simple codes, the final contents being interpreted by the computerized methods 162 executing on the CD. When a server is involved, the MD may send the orientation data to the server, which forwards them to the CD, in addition to contents, as illustrated in FIG. 9. In that case, the connection to the MD may be physical only, while the CD has access to the server 30 via the MD 20 or a network card 14, and via the network 165.

In variants, contents may be received from the MD, as shown in FIG. 8, and then subject to security checks, step S67. Most advantageous is however to pass those contents (or a hash value thereof) to a server 30 for cross-checking them. But other types of checking operations could be involved, possibly locally at the CD only.

The CD may communicate with the server 30 via the MD 20. In that case, the CD's communication means shall be prompted by the methods 162 to set up a suitable communication link with the server 30, via the MD 20. The CD may for instance connect to the MD 20 and then connect to the server 30 via an Internet connection provided by the MD. It may for instance open a network socket, similarly as any application running on the MD that requires Internet access. This option may involve user confirmation, depending on the operating system of the MD. The server is then preferably securely accessed by the CD using, for instance, an SSL/TLS connection for security purposes.

In the embodiment of FIG. 10, the CD communicates, on the one hand, with the MD 20 to receive S60 orientation data and, on the other hand, with the server 30 to receive S65 or cross-check S67 contents. In that case, the CD's communication means shall be prompted by entity 162 to set up the respective communication links.

Hybrid approaches can be thus contemplated. For example, contents to be displayed are provided by the server to the CD e.g., either directly or encrypted via the MD, while the orientation data can flow directly from the MD to the CD, as illustrated in FIG. 10. As said, in variants, the contents may come from the MD but still be cross-checked at the server. Such mechanisms are secure inasmuch as they provide secure contents, the latter coming from or cross-checked at the server. Still, the orientation is not security sensitive and therefore can be passed directly to the CD, as illustrated in FIG. 10.

The above methods may further include steps that reflect functionality already described in reference to the device 10. For example, referring to FIG. 5, the step of displaying S70 the re-arranged contents may include restricting the contents displayed to a symmetric area 19a, e.g., a 4-fold rotationally symmetric area, fitting in a screen area of the screen 19 of the CD. This step may further include instructing to off-center the symmetric area, e.g., towards user controls 18a, 18b. In variants, the whole screen may be used and the contents reflowed or more generally re-arranged, as necessary, at the CD or at an external entity 20, 30. In addition, as evoked earlier, entity 162 may establish a bidirectional communication link with and/or via MD 20. Finally, user interactions may be desired, such that present methods may further include a step of communicating S90 user instructions as received at the CD to the MD 20 and/or the server 30 via the MD. Next, according to a final aspect, the invention can be embodied as a computer program product, including program code means 162 for implementing the steps of the computerized methods described above.

The above embodiments have been succinctly described in reference to the accompanying drawings and may accommodate a number of variants. Several combinations of the above features may be contemplated. Examples are given in the next section. At present more details are given, which concern possible embodiments of CD 10, system 100 of FIG. 6, and the methods of FIGS. 8-10.

Handheld companion device 10 is preferably a secure device, e.g., equipped with a secure memory. This device is typically a corporate or personal secure device, that is, a handheld device that a company or a user owns and controls, such as a Universal Serial Bus (USB) device, preferably a USB flash drive (a data storage device that includes flash memory, in addition to an integrated USB interface), that only this user uses or that is owned and controlled by the company this user works for or is a customer of, in the case of e-Banking scenarios.

As said earlier, this device is preferably run by a light firmware (on the order of 600 KB or less, e.g., 300 KB): device 10 is preferably not equipped with a full-fledged operating system. It is much preferably non-programmable by the user. It includes a persistent memory 16, preferably a secure memory, storing notably the computerized methods 162, as well as other files 164 (e.g., decryption keys, parameters, files, etc.). The memory is suitably coupled to a processing means 12, notably for executing the methods 162. The processing means 12 are preferably provided in the form of a system on-a-chip (or SOC), including e.g., processor and digital-to-analog converter (or DAC) and analog-to-digital converter (or ADC) for the audio connector 13, if any. As discussed earlier, the CD 10 may in fact be provided with at least one connection interface 13a, e.g., a TRRS or USB communication interface, for communicating with an external entity via connector 13. Typically, this device weighs less than 200 g, preferably less than 60 g and more preferably less than 40 g. To facilitate handling, the CD 10 is preferably (substantially) smaller and lighter than a typical MD 20 it connects to.

The device 10 may further be provided with a smart card reader 17 to read user credentials stored on the smart card 40, e.g., in standard-, or preferably micro- or, even, nano-SIM format. Suitable use can safely be made out of such data, e.g., user credentials as stored on the card. In particular, a trustworthy connection can be established between a user or strictly speaking the CD 10 and a third party 20, 30, e.g., a server such as server 30 shown in FIG. 6, possibly via the MD 20, which trustworthy connection may require using such data. In a variant, the user credentials may be stored directly on the persistent memory 16 of the secure device 10. In that respect, one may design or reuse any suitable cryptographic protocol to encode/decode the security-sensitive information to be displayed and signed by the device.

Further user interfaces like control buttons 18a, 18b are provided to allow for direct interaction with the user. Also, the device may include an on-off switch 15, although one of the buttons 18a, 18b could be reused, in variants, for on/off using for instance a lengthy press. The device can else be powered on and off via the connector 13 upon insertion and removal. In variants, the device 10 may include a battery 11, and possibly be provided with at least one solar cell to charge a battery.

The CD 10 may further be equipped with network connectivity means 14, operatively coupled to the processing means 12 to enable secure connection with remote server 30, i.e., via a network 165. As illustrated in FIG. 6, such network connectivity means may allow for enabling a connection with server 30, independently or in addition to a connection via the MD 20.

Different types of connections can be contemplated. For instance: a separate connection enabled and maintained by connectivity means 14 independently from the MD 20 or a shared connection. The network connectivity means 14 may indeed share a connection, i.e., use a network connection as enabled by a neighboring device 20, e.g., by tethering over a connection enabled by the MD 20 or, in fact, any neighboring device that allows to do so. Shared connections are generally known per se. In the present case, it merely requires to suitably connect means 14, e.g., a connectivity package, to the processing means 12. Additional device configuration steps may further be required, e.g., by the MD or any neighboring device and possibly by the CD too, in order to authorize the shared connection, as known in the art.

For example, techniques are generally known which allow for sharing an Internet connection of an Internet-capable PDA such as a mobile phone with other devices. Such a sharing can be provided over a wireless LAN Wi-Fi or over Bluetooth or, still, by physically connecting the device 10 and exploiting a bidirectional link established over a connector 13 with the MD 20, as discussed earlier. To that aim, one may take advantage of a TRRS/USB capability 13 of the CD 10. A wireless connection e.g., tethering over wireless LAN is advantageous in terms of ergonomics. However, it is more expensive than a solution where links are established over a connector 13, via the MD 20, to the server. For example, the Internet-connected MD 20 could act as a portable router when providing tethering services to the CD 10. Thus, in the present case, the CD may share a connection with a neighboring device, wirelessly or not. As a result, a secure connection can be established with a server 30, over a network connection enabled by the MD 20.

Data communications between the device 10 and the server 30 shall preferably be carried out by means of: An HTTPS connection from server 30 to device 10 through computer MD 20; End to end mutual authentication; and Data signatures and encryption of transmitted data, if needed.

In variants, the connectivity means 14 maintain their own network access e.g., GPRS, WLAN, as known per se. In this case, a secure connection can be established with server 30 as well, yet independently from the MD 20. Such a solution is again more expensive than a solution involving a physical connector 13 to connect via the MD 20 to the server. However, latency is reduced since no additional interactions with the MD 20 are needed to contact the server 30. Here also the communications with server 30 may use end-end mutual authentication and encryption.

FIG. 6 represents a general computerized system, suited for implementing method steps as involved in embodiments of the invention.

It will be appreciated that the methods described herein are largely non-interactive, and automated by way of computerized systems, such as servers 30, CD 10 and MD 30. In exemplary embodiments, the methods described herein can be implemented in a (partly) interactive or non-interactive system. These methods can further be implemented in software (e.g., firmware), hardware, or a combination thereof. In exemplary embodiments, the methods described herein are implemented in firmware, as an executable program, and is executed by processing means 12 of the CD. Concurrently, applications may be executed at the MD 20 and/or at the server 30, which interact with entity 162.

The minimal system 100 includes a CD 10 and a MD 20, the former rigidly connected to the latter. It preferably also involves a network 165 and a server 30, or any suitable network entity 30.

In exemplary embodiments, in terms of hardware architecture, as shown in FIG. 6, the CD 20 includes a processor 105, memory 110 coupled to a memory controller 115. Input and/or output (I/O) devices or peripherals (e.g., the CD 10) can be communicatively coupled via a local input/output controller 135. The input/output controller 135 can be included, but is not limited to, at least one bus or other wired or wireless connection, as is known in the art. The input/output controller 135 may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 105 is a hardware device for executing software, particularly software that is stored in memory 110. The processor 105 can be any custom made or commercially available processor, a central processing unit (CPU), an auxiliary processor among several processors associated with the CD 20, a semiconductor based microprocessor (in the form of a microchip or chip set), or generally any device for executing software instructions.

The memory 110 can include any one or combination of volatile memory elements (e.g., random access memory) and nonvolatile (persistent) memory elements, e.g., EEPROM. In particular, memory 110 shall include memory portion 121 to which software modules from the CD 10 may be transferred, in whole or in part, for subsequent execution, concurrently with execution of the methods 162 at the CD 10, if needed. The software in memory 110 may notably include at least one separate program, each of which includes a listing of executable instructions for implementing logical functions, notably functions involved in embodiments of this invention, e.g., to provide orientation data or, even, contents, to the CD 10. In the example of FIG. 6, memory 110 may be loaded with software including instructions to that aim, as well as instructions for initiating communication between the device 10 and the server 30, via the network 165.

The software in memory 110 may also typically include a suitable operating system (OS) 111. Once (and if) loaded, the OS 111 essentially controls the execution of other programs, and provides scheduling, input-output control, file and data management, memory management, and communication control and related services.

At least part of the computerized methods described herein may be in the form of a source program, executable program (object code), script, or any other entity including a set of instructions to be performed. When a source program, then the program needs to be translated via a compiler, assembler, interpreter, or the like, which may or may not be included within the memory of the device 10, host 20 and/or server 30. Furthermore, the methods can be written as an object oriented programming language, which has classes of data and methods, or a procedure programming language, which has routines, subroutines, and/or functions.

The MD 20 further includes a display controller 125 coupled to a display 29. In exemplary embodiments, the MD can further include network interface 124 for coupling to a network 165. The network 165 can be an IP-based network for communication between the CD 20 and any external server, client and the like via a broadband connection. The network 165 transmits and receives data between the CD 20 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

When the CD 20 is in operation, the processor 105 is configured to execute software stored within the memory 110, to communicate data to and from the memory 110, and to generally control operations of the CD 20 pursuant to the software.

As will be appreciated by one skilled in the art, aspects of the present invention may be embodied as a device 10, a system 100, methods or computer program product. Accordingly, aspects of the present invention may take the form of an entirely hardware embodiment, an entirely firmware and/or software embodiment (firmware, resident software, micro-code, etc.) or an embodiment combining firmware/software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium, i.e., any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the CD 10, and further involve code executing on two or more of the following: the CD 10, the MD 20 and other(s) network entity(ies) 30.

Aspects of the present invention are described below with reference to flowchart illustrations and/or block diagrams of methods, devices (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to processor 12, 105 of devices 10, 20, 30 or other programmable data processing apparatus to produce a machine, such that the instructions, which execute via the processor or other programmable data processing apparatus, create means for implementing the functions/acts specified in the flowchart and/or block diagram block or blocks.

These computer program instructions may also be stored in a computer readable medium that can direct a computerized device 10, 20, 30 or the system 100 to function in a particular manner, such that the instructions stored in the computer readable medium produce an article of manufacture including instructions which implement the function/act specified in the flowchart and/or block diagram block or blocks.

The computer program instructions may also be loaded onto a computerized device or system, other programmable data processing apparatus, or other devices to cause a series of operational steps to be performed, to produce a computer implemented process such that the instructions which execute on devices 10-30 or other programmable apparatus provide processes for implementing the functions/acts specified in the flowchart and/or block diagram block or blocks.

The flowchart and block diagrams in the Figures illustrate the architecture, functionality, and operation of possible implementations of devices, systems, methods and computer program products according to various embodiments of the present invention. In this regard, each block in the flowchart or block diagrams may represent a module, segment, or portion of code, which includes at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 8 shows the following steps: S10: A CD and MD are provided; S15: The MD determines the natural orientation of MD; S20: The CD is rigidly connected to the MD; S30: The CD starts cooperating with the MD; S40: The MD determines the relative angle β; S50: The MD determines its current orientation α; S60: The MD sends orientation data to CD; S70: The CD can thus re-arrange and display contents based on such orientation data; S80: If the orientation changes, a new current orientation is determined, step S50. Then, the MD sends the new orientation data to the CD, which can thus re-arrange and display the contents based on the new orientation data, steps S60-S70, etc.;

In parallel to steps S30-S60, if it is determined that new contents should be sent to the CD, step S63, the MD sends the new contents, step S65; S67: The CD may proceed to check the contents, a step that may involved verification/cross-checking via an external entity 30, as touched earlier; The process goes to step S70, where the CD can re-arrange and display the new contents, based on the latest orientation data received, step S70; S90: Finally, user interaction via control 18a, 18b may prompt the CD to communicate user inputs (validation/invalidation) to the MD.

FIG. 9 is similar to FIG. 8, except that: At step S10, a server is provided in addition to the CD and MD; A new step S28 is provided, whereat the MD starts cooperating with the server for establishing a connection therewith, whereby, at step S30, the CD may start cooperating with the server, for receiving orientation data (step S62) and content (step S65) therefrom. This implies that, at step S60, the MD sends its orientation data to the server, rather than to the CD; S70: The CD can thus re-arrange and display contents based on orientation data, all being received from the server.

FIG. 10 is most similar to FIG. 9, except that, at step S60, the MD sends the orientation data directly to the CD, as in FIG. 8, and in contrast with FIG. 9.

Thus, as noted earlier, FIG. 8 mainly involves a CD and MD (though step S67 may additionally involve a server), whereby both the contents and orientation data are provided by MD 20 to the CD. In FIGS. 9-10, a server is involved as well, which sends contents to be displayed at the CD. In FIG. 9, the MD sends the orientation data to the server, S60, which provides them in turn to the CD, S62, such that no communication link need be established between the MD and the CD. Rather, the CD and the MD connect, each, to the server 30. In FIG. 10, two distinct links are established, a first one between the MD and the CD to pass orientation data (step S60), and a second one between the server and the CD, to provide or validate contents to be displayed at the CD, step S65.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, where technically sound, without departing from the scope of the present invention. Various combinations of the features described in respect of any of the above embodiments or variants may accordingly be contemplated, that remain within the scope of the appended claims. In addition, many minor modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, additional user controls may be provided adjacent to controls 18a, 18b.

What is claimed is:

1. A handheld companion device, comprising:
   a screen;
   rigid physical connection means, adapted for rigidly attaching the companion device to a mobile device;
   communication means, adapted for setting up and supporting one or more communication links with one or more external computerized systems; and
   a memory, storing computerized methods, which are adapted, upon execution at the companion device, for:
   cooperating with the communication means to set up the at least one communication link and receive orientation data of the mobile device and contents, from the at least one external computerized system, via the at least one communication link; and
   re-arranging and displaying said contents on said screen according to said orientation data,
   wherein the computerized methods are designed, upon execution at the companion device, for re-arranging the contents according to:

a dynamic rotation angle, by which the mobile device is rotated relative to a reference orientation; and, a fixed, relative angle between a reference axis of the mobile device and a reference axis of the companion device, when the companion device is attached to the mobile device; or, a total angle depending on both the dynamic rotation angle and the fixed, relative angle.

2. The companion device of claim 1, wherein the rigid physical connection means comprises:

a communication circuit, the latter forming part of the communication means, said communication circuit adapted for supporting at least one communication links.

3. The companion device of claim 1, wherein the screen of the companion device has a square aspect ratio.

4. The companion device of claim 1, further comprising:
user interface controls provided on an edge surface opposite to an edge surface on which the rigid physical connection means is located, and wherein most or all physical user interface controls of the companion device are provided on the opposite edge surface only.

5. The companion device of claim 1, wherein the rigid physical connection means is a bidirectional communication connector, the communication means being adapted for communicating with the mobile device via audio signaling across a tip-ring-ring-sleeve bi-directional audio-link.

6. A system comprising a companion device according to claim 1 and the mobile device, the companion device rigidly attached to the mobile device.

7. A method for re-arranging contents and displaying re-arranged contents on a screen of the companion device according to claim 1, the method comprising:

cooperating with the communication means to set up the at least one communication link and receive contents and orientation data of the mobile device, from the at least one external computerized system upon attaching a companion device to a mobile device; and re-arranging and displaying the contents on the screen according to the orientation data.

8. The method of claim 7, wherein cooperating with the communication means comprises:

communicating with the mobile device and/or a server to receive the contents and orientation data of the mobile device.

9. The method of claim 7, wherein cooperating with the communication means comprises:

communicating with a server via the mobile device.

10. The method of claim 9, wherein cooperating with the communication means comprises:

communicating with the mobile device to receive orientation data; and communicating with the server to receive or cross-check contents.

11. The method according to claim 7, wherein cooperating with the communication means comprises:

establishing a bidirectional communication link with and/or via the mobile device, the method further comprising:

communicating a user instruction to the mobile device and/or a server via the mobile device upon receiving the user instruction via a user interface of the companion device.

12. A computer readable non-transitory article of manufacture tangibly embodying computer readable instructions which, when executed, cause a computer to carry out the steps of the method according to claim 7.

13. A handheld companion device, comprising:
a screen;
rigid physical connection means, adapted for rigidly attaching the companion device to a mobile device;
communication means, adapted for setting up and supporting one or more communication links with one or more external computerized systems; and
a memory, storing computerized methods, which are adapted, upon execution at the companion device, for:
cooperating with the communication means to set up the at least one communication link and receive orientation data of the mobile device and contents, from the at least one external computerized system, via the at least one communication link; and
re-arranging and displaying said contents on said screen according to said orientation data,
wherein the computerized methods are further adapted for restricting the contents displayed to an area having at least 4n-fold rotational symmetry, with n≥1 within a screen area of the screen of the companion device, the area having at least 4n-fold rotational symmetry being off-centered towards an edge surface of the companion device that comprises user interface controls.

14. A method for re-arranging contents and displaying re-arranged contents on a screen of a handheld companion device, the handheld companion device including:
a screen;
rigid physical connection means, adapted for rigidly attaching the companion device to a mobile device;
communication means, adapted for setting up and supporting at least one communication link with at least one external computerized system; and
a memory, storing computerized methods, which are adapted upon execution at the companion device, the method comprising:
cooperating with the communication means to set up the at least one communication link and receive contents and orientation data of the mobile device, from the at least one external computerized system upon attaching a companion device to a mobile device; and
re-arranging and displaying the contents on the screen according to the orientation data,
wherein displaying the re-arranged contents comprises:
restricting the contents displayed to an area having at least 4n-fold rotational symmetry, with n≥1, fitting in a screen area of the screen of the companion device; and
instructing to off-center the area having at least 4n-fold rotational symmetry.

* * * * *